(12) United States Patent
Hoff

(10) Patent No.: US 10,032,174 B2
(45) Date of Patent: Jul. 24, 2018

(54) MANAGEMENT OF SALES OPPORTUNITIES

(75) Inventor: Roland Hoff, Walldorf (DE)

(73) Assignee: SAP SE, Walldorf (DE)

( * ) Notice: Subject to any disclaimer, the term of this patent is extended or adjusted under 35 U.S.C. 154(b) by 2761 days.

(21) Appl. No.: 11/830,911

(22) Filed: Jul. 31, 2007

(65) Prior Publication Data

US 2009/0037195 A1   Feb. 5, 2009

(51) Int. Cl.
*G06Q 30/02* (2012.01)

(52) U.S. Cl.
CPC ......... *G06Q 30/02* (2013.01); *G06Q 30/0281* (2013.01)

(58) Field of Classification Search
CPC ................................. G06Q 30/00; G06F 17/30
See application file for complete search history.

(56) References Cited

U.S. PATENT DOCUMENTS

| | | | |
|---|---|---|---|
| 7,096,188 B1* | 8/2006 | Schlick et al. | 705/7.13 |
| 7,228,284 B1* | 6/2007 | Vaillancourt | G06Q 10/063 705/7.13 |
| 2002/0046157 A1* | 4/2002 | Solomon | G06Q 30/02 705/37 |
| 2002/0052774 A1* | 5/2002 | Parker | G06Q 30/02 705/7.32 |
| 2003/0154120 A1* | 8/2003 | Freishtat | G06Q 30/00 705/26.41 |
| 2004/0015387 A1* | 1/2004 | Nishikawa | G06Q 30/02 705/7.32 |
| 2006/0074919 A1* | 4/2006 | Grover et al. | 707/10 |
| 2006/0155596 A1* | 7/2006 | Thier | 705/10 |
| 2006/0167942 A1* | 7/2006 | Lucas et al. | 707/104.1 |
| 2007/0078697 A1* | 4/2007 | Nixon | 705/9 |
| 2007/0150455 A1* | 6/2007 | Richter | G06F 17/30864 |
| 2007/0219848 A1* | 9/2007 | Hubsher | 705/10 |

(Continued)

FOREIGN PATENT DOCUMENTS

WO   WO 2006077943 A1 *   7/2006

OTHER PUBLICATIONS

"Select Response Family of Products", Aptex Software, Inc. Aug. 17, 1998.*

(Continued)

*Primary Examiner* — Pan G Choy
(74) *Attorney, Agent, or Firm* — Brake Hughes Bellermann LLP

(57) ABSTRACT

An inquiry handler may be configured to receive one or more customer inquiries in response to one or more pre-sales documents associated with a product. An opportunity parser may be configured to determine a sales opportunity associated with the one or more customer inquiries based on the pre-sales documents. An activity engine may be configured to track one or more sales activities performed with respect to the sales opportunity and in response to the one or more customer inquiries. A status engine may be configured to determine a status of each of the one or more customer inquiries based on the one or more sales activities. A report generator may be configured to generate one or more activity reports associated with the sales opportunity based on the one or more customer inquiries and including the status associated with each customer inquiry.

21 Claims, 5 Drawing Sheets

(56) References Cited

U.S. PATENT DOCUMENTS

2008/0168074 A1* 7/2008 Inagaki ............. G06F 17/30017
2008/0201242 A1* 8/2008 Minnis et al. .................. 705/27

OTHER PUBLICATIONS

"Opportunity Calling", by Maria Bruno-Britz, Bank System & Technology, Jan. 2006.*

"Data Mining for Automated Evaluation of Sales Opportunities", by Jamshid Vayghan, The Graduate School of the University of Minnesota, Oct. 2003.*

"Mastering Inquiries and Sales Leads", by Robert H. Collins, University of Nevada, Las Vegas, The Journal of Personal Selling & Sales Management; Summer 1989; 9, 2; ABI/INFORM Global, p. 73.*

"LeadTrack . . . Beyond Contact Management", by Rick Wirth, Marketing Manager, Robicon, Inc., http://web.archive.org/web/20010202060400/http://leadtrack.com/.*

"Managing Channels of Distribution", by Kenneth Rolnicki, American Management Association, 1998.*

"Effective Inquiry Management—Book two in Global Source Effective Export Marketing series", by Global Sources, Trade Media Holdings Ltd. 2005.*

"Effective Call Center Management Evidence from Financial Services", by Ann Evenson et al., The Wharton School, Jan. 1999.*

* cited by examiner

| Category | Inquiry Text | Prio | Status | Satisfaction Level (0–5) | Customer Contact | Activities | Last Activity |
|---|---|---|---|---|---|---|---|
| Perform. | Can it receive 60,000 sales orders per hour? | 1 | NOK | 1 | Miller | 5 | 17.04.2007 |
| Useability | Can opportunity items be configured? | 1 | No Answer/ No Decision | | Johnson | 7 | 05.04.2007 |
| Useability | Can order flexibility be added? | 2 | NOK | 2 | Peterson | 4 | 17.04.2007 |
| Function. | Are there business partner hierarchies? | 2 | No Answer/ No Decision | | Peterson | 3 | 12.04.2007 |
| Function. | Are product substitutions allowed? | 2 | No Answer/ No Decision | | Peterson | 3 | 12.04.2007 |
| Function. | Why are there no sales allowed in service orders? | 2 | OK | 4 | Johnson | 2 | 10.03.2007 |
| Useability | Can the order creation be simplified? | 2 | OK | 5 | Miller | 3 | 10.03.2007 |
| Perform. | Can the quarterly report be generated within 10 hours? | 3 | No Answer/ No Decision | | Miller | 3 | 17.04.2007 |
| Function. | Can we integrate marketing campaigns with sales orders? | 3 | OK | 3 | Johnson | 1 | 10.03.2007 |

| Opportunity | ... | Status | | |
|---|---|---|---|---|
| | | Priority 1 | Priority 2 | Priority 3 |
| Comp42 | ... | 0 1 0 | 0 1 0 | 0 1 0 |
| Comp24 | ... | 1 1 0 | 1 2 2 | 0 1 1 |
| Comp03 | ... | 1 5 0 | 1 2 0 | 1 1 0 |

MANAGEMENT OF SALES OPPORTUNITIES

TECHNICAL FIELD

This description relates to management of sales opportunities.

BACKGROUND

Sales are an integral part of most businesses. The sales period, the time during which a sales representative is trying to sell a product or service to a customer, may last anywhere from a couple of minutes to several months depending, at least in part, on the complexity of the product to be sold, wherein more complex and/or more expensive products may have longer sales periods.

During the course of the sales period, the customer or client to whom the product is being offered or sold may have questions about the product, wherein complex products and/or longer sales periods may result in more customer inquiries being raised. The customer may then submit these questions or inquiries to the sales representative, or team of sales representatives, trying to sell the product to the customer. It may then be the responsibility of the sales representative(s) to respond to the customer inquiries in order to increase the chance of success of selling the product to the customer.

Managing the customer inquiries, however, may be a necessary but time-consuming task for the sales representative who is interested in succeeding, or at least increasing a chance of succeeding, in finalizing the sales opportunity. For example, it may be difficult for the sales representative to track the inquiries with respect to the product, or to know a relative priority level or other status of the inquiries with respect to each other (e.g., whether a customer inquiry has been resolved or otherwise responded to). It also may be difficult for the sales representative to determine what, if any, sales activity was performed in response to each inquiry, and whether the customer was satisfied with the response.

SUMMARY

According to an example embodiment a system is provided, in which an inquiry handler is configured to receive one or more customer inquiries in response to one or more pre-sales documents associated with a product. An opportunity parser is configured to determine a sales opportunity associated with the one or more customer inquiries based on the pre-sales documents. An activity engine is configured to track one or more sales activities performed with respect to the sales opportunity and in response to the one or more customer inquiries. A status engine is configured to determine a status of each of the one or more customer inquiries based on the one or more sales activities. A report generator is configured to generate one or more activity reports associated with the sales opportunity based on the one or more customer inquiries and including the status associated with each customer inquiry.

According to another example embodiment a computer program product is configured for handling sales opportunity information, the computer program product being tangibly embodied on a computer-readable medium and including executable code that, when executed, is configured to cause a data processing apparatus to provide an activity report associated with a sales opportunity. The activity report comprises one or more customer inquiries associated with the sales opportunity, a classification of each of the one or more customer inquiries including at least one of a priority or a category, a customer satisfaction level based on a responsiveness of a performance one or more sales activities to each of the one or more customer inquiries, the performance being based on the classification, and a status of each of the one or more customer inquiries based on the customer satisfaction level and associated with the one or more sales activities.

According to another example embodiment a method is provided. A plurality of customer inquiries are received in response to one or more pre-sales documents associated with a product. A sales opportunity associated with the customer inquiries is determined based on the one or more pre-sale documents associated with the product. A status of each customer inquiry is determined based on a performance of one or more sales activities associated with the opportunity. An activity report associated with the sales opportunity is generated based on the customer inquiries and including the status.

The details of one or more implementations are set forth in the accompanying drawings and the description below. Other features will be apparent from the description and drawings, and from the claims.

BRIEF DESCRIPTION OF THE DRAWINGS

FIG. 3 is a block diagram of an example of the activity report of FIG. 2, according to an example embodiment.

FIG. 4 is a block diagram of an example of the activity report of FIG. 2, according to an example embodiment.

DETAILED DESCRIPTION

Figure 1:
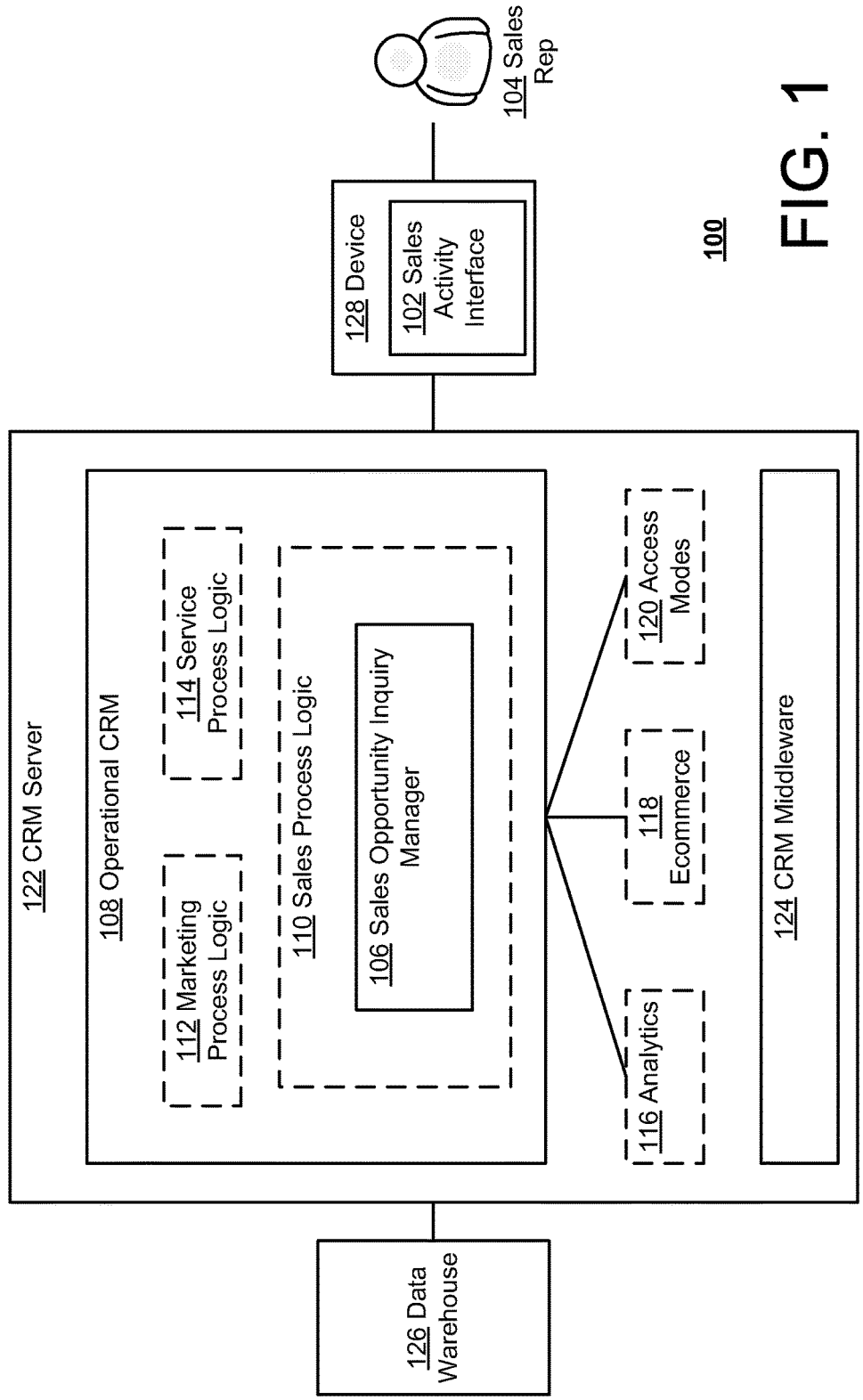
FIG. 1 is a block diagram of an example customer relationship management system that includes a sales opportunity and customer inquiry system, according to an example embodiment.

FIG. 1 is a block diagram of an example customer relationship management system 100 that includes a sales opportunity and customer inquiry system, according to an example embodiment. In the example of FIG. 1, the system 100 manages a plurality of inquiries provided during a sales period associated with a product or service to be sold. For example, a sales representative 104 may be responsible for selling the product to a customer and responding to the customer inquiries. Then for example, the system 100 may manage (e.g., prioritize, categorize and track) the customer inquiries for the sales representative 104, so that the sales representative 104 may more quickly determine whether and how to respond to each of the customer inquiries.

A sales activity interface 102 may display information (including customer inquiry information) regarding, and organized with respect to, one or more sales opportunities associated with the sales representative 104 and/or other user. For example, the sales activity interface 102 may display the customer inquiries received from a customer to whom the sales representative 104 is responsible to sell a product. The sales activity interface 102 may for example display the customer inquiries, including the status of each inquiry, organized based on the customized preferences of the sales representative 104.

The sales representative 104 may represent, for example, any user of the sales activity interface 102. For example, the sales representative 104 may include a sales representative who may use the sales activity interface 102 to view or manage his or her customer accounts and/or sales opportunities, including the customer inquiries and/or responses to customer inquiries associated with each account or opportunity. In other example embodiments the sales representative 104 may include additional and/or different users, including, for example, a manager who may use the sales activity interface 102 to view or manage the sales opportunities and/or customer inquiries of one or more associates whom the manager may be managing.

The sales activity interface 102 may be associated with, and/or provided by, a sales opportunity inquiry manager 106. The sales opportunity inquiry manager 106 may be configured to manage the sales opportunities including the customer inquiries associated therewith for the sales representative 104, in a way that is easily accessible by, and useful to, the sales representative 104. For example, the sales opportunity inquiry manager 106, perhaps in conjunction with other CRM components, may determine which customer inquiries associated with a sales opportunity are of the highest priority, have been responded to by the sales representative 104 (including the details of the responses) and which customer inquiries remain unresolved. The sales opportunity inquiry manager 106 may also, according to an example embodiment, be used to determine a likelihood of success of a sales opportunity based at least in part on a customer satisfaction level associated with the sales representative's 104 response to the customer inquiries.

As shown, the sales opportunity inquiry manager 106 may be part of a customer relationship management (CRM) system, which may include operational CRM 108. Operational CRM 108 may be used, for example, to automate various business processes, or to otherwise provide automated support of various aspects of customer relationship management. For example, operational CRM 108 may provide automated support for sales, marketing, and service for a business or businesses through sales process logic 110, marketing process logic 112, and service process logic 114, respectively.

In more specific examples, the sales process logic 110 may data mine and/or provide business transaction or sales information about one or more business transactions or issues. For example, the sales process logic 110 may automate or provide information about predicting future sales, whom to contact in case of an issue, what actions to take to address an issue, provide administrative sales support, determine value information regarding a customer and/or business transaction, maintain customer-specific information, and/or otherwise data mine business data based on one or more defined issues. In the example embodiment of FIG. 1, the sales process logic 110 includes the sales opportunity inquiry manager 106, as shown, however, according to other example embodiments, the sales opportunity inquiry 106 may be included (in whole or in part) or otherwise associated with other portions of the system 100, including for example, service process logic 114.

Somewhat similarly, the marketing process logic 112 may automate and/or provide information about marketing. For example, the marketing process logic 112 may automate or provide information about current marketing trends, or may support implementation of a current marketing plan. For example, the marketing process logic 112 may conduct surveys, send e-mails or other communications to customers regarding a current marketing plan, or coordinate with marketing service providers to implement a marketing plan therewith.

The service process logic 114 may automate and/or provide information about services provided to customers as part of a sale or other interaction with the customers. For example, the service process logic 114 may automate and/or provide information about customer complaints or requests, or may provide technical or other support to customers, or may handle customer exchanges or refunds.

Thus, the operational CRM 108 provides support and assistance for identifying current or potential customers, executing sales to the customers, and then providing assistance to the customers in support of the executed sales. In other words, the operational CRM 108 facilitates present and future interactions between an enterprise (including the user 104) and its customers. Consequently, although not specifically or separately illustrated in FIG. 1, the operational CRM 108 may include, or be associated with, collaborative CRM, which may provide and manage a number of different communication techniques (e.g., e-mail, telephone, or other interactions) between the sales representative 104 or other user and a given customer(s). Thus, such collaborative CRM facilitates interactions, or collaborations, between various associated entities (e.g., between sales representatives and customers, between service providers and customers, and/or between marketing professionals/campaigns and customers)

As may be appreciated from the above description, the operational CRM 108 thus may be used to establish, maintain, and grow customers over a lifetime of the enterprise. In this regard, the operational CRM 108 may be assisted by other CRM features, e.g., analytics 116, ecommerce 118, and access modes 120.

The analytics 116, for example, may analyze data gathered by the operational CRM 108 (or by components thereof), or relevant data that is otherwise available, in order to improve or enhance customer relationships. For example, the analytics 116 may analyze data gathered by the sales process logic 110 and provide this information to the user 104 through the interface 102 (e.g., to identify new customers, increase profitability, or otherwise facilitate the job of the user 104). Similarly, the analytics 116 may analyze data associated with a marketing campaign of the marketing process logic 112. The analytics 116 also may provide support to the service process logic 114, e.g., by analyzing a success rate of a customer call center, or by tracking a number of returns of a sold product.

Ecommerce 118 may provide a way to manage a company's electronic commerce and/or internet interactions. For example, ecommerce 118 may manage the sales process logic 110 when customers purchase merchandise using a website of the enterprise, or using affiliate websites.

The access modes 120 may provide various views of a CRM processes depending on which user may be trying to access the system. For example, the access mode 120 may provide a first view of the sales activity interface 102 when the sales representative 104 is a sales representative responsible for one or more customer accounts or sales opportunities, and the access mode 120 may also provide a second view of the sales activity interface 102 when the sales representative 104 is a sales manager responsible for one or more sales representative and/or customer accounts or sales opportunities.

The operational CRM 108, including the analytics 116, ecommerce 118, and the access modes 120 may all be run using a CRM server 122. The CRM server 122 may provide some or all of the customer relationship management (CRM) system referenced herein to other computing systems over a network. For example, the CRM server 122 may use CRM middleware 124 to provide CRM sales data from a data warehouse 126 to the operational CRM 108 for processing (e.g. by the sales processing logic 110 and/or the sales workbench system 106), and then to the device 128 for display on the sales activity interface 102.

The CRM middleware 124 may connect software components, devices and/or applications, including distributed applications and back-end or legacy applications. For example, the CRM middleware 124 may connect the CRM server 122 or operational CRM 108 to the data warehouse 126. The CRM middleware 124 may also for example, allow the interface 102 to interact with the data warehouse 126 through the operational CRM 108. The CRM middleware 124 may implement an appropriate messaging infrastructure, or other integration services or capabilities, as needed.

The data warehouse 126 may represent one or more of a database, memory or other storage device(s) containing information related to the CRM system. For example, the data warehouse 126 may contain customer account information, contact information, sales information, business transaction information and/or other business data that may be managed by the business transaction inquiry manager 106 and displayed in the sales activity interface 102 which may run on the device 128. In another example embodiment, the CRM information may be stored in multiple (types of) data warehouses 126, which may communicate with the CRM server 122.

The device 128 may be any device configured to display and/or interact with a CRM system. For example, the device 128 may be a personal digital assistant (PDA), mobile phone, laptop, desktop computer or other device capable of communicating with the CRM server 122 and allowing a user 104 to interact with the interface 102. In another example embodiment, multiple devices 128 may communicate with the CRM server 122.

The above description provides example implementations of a CRM system. It will be appreciated that many other features and functions may be included in such a CRM system than may be described here in detail. Further, the illustrated CRM system and system components may interact in any known or acceptable manner, e.g., using an underlying application platform. Thus, the various illustrated components may be combined, or may communicate with one another, in any acceptable or desired fashion. For example, the analytics 116, or component(s) thereof, may be considered to be part of (components of) the operational CRM 108, such as when the marketing process logic 112 includes analytics for analyzing a customer response to a previous marketing campaign.

Figure 2:
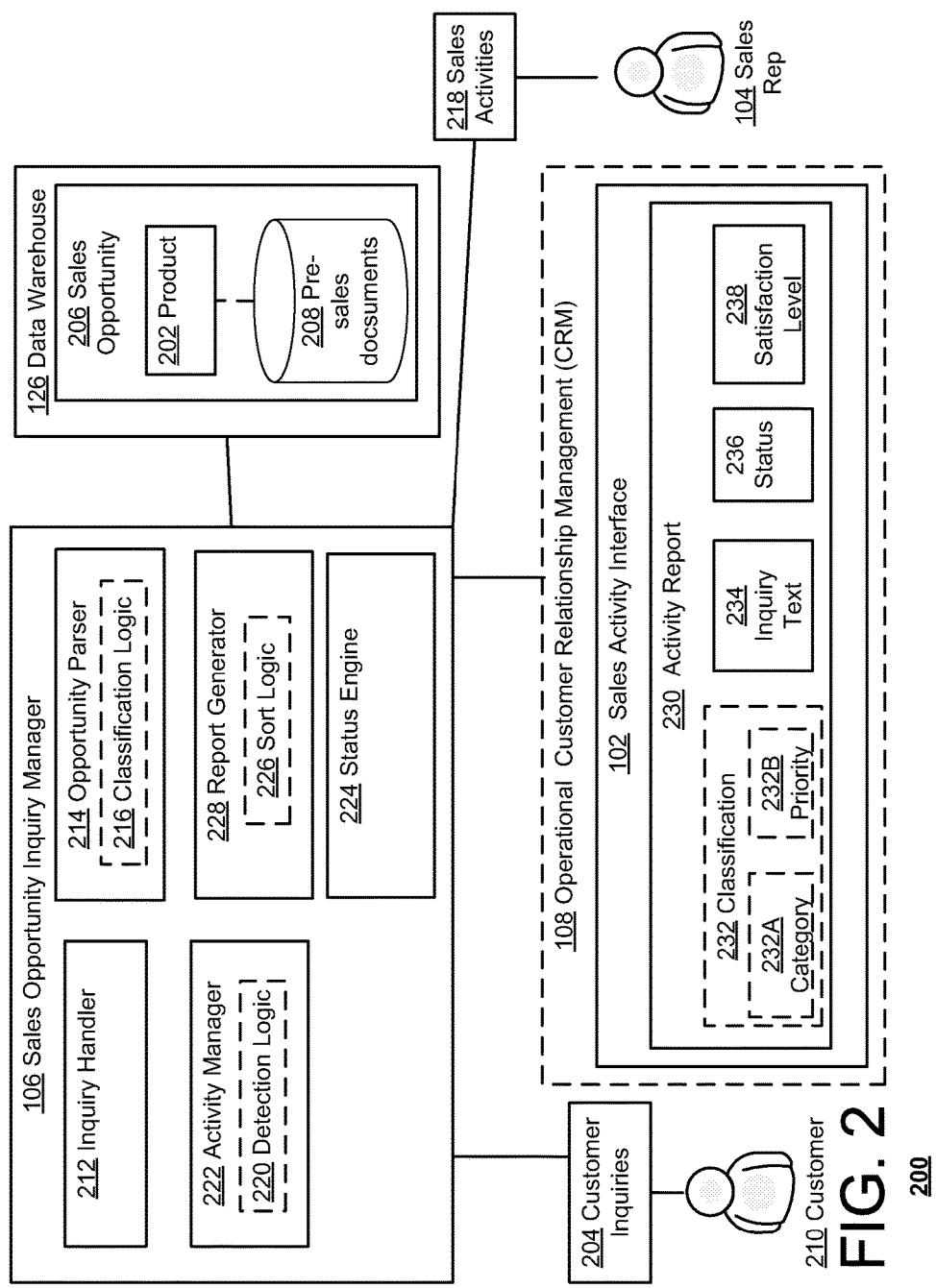
FIG. 2 is a block diagram of an example system for the sales opportunity and customer inquiry system of FIG. 1, according to an example embodiment.

FIG. 2 is a block diagram of an example system 200 for the sales opportunity and inquiry system of FIG. 1, according to an example embodiment. In the example of FIG. 2, the sales opportunity inquiry manager 106 may manage a plurality of customer inquiries 204 associated with a product 206 and received within a sales period of a sales opportunity 206.

The product 202 may represent any product or service offered for sale to one or more potential customers (e.g., customer 210) or clients. The product 202 may include a complex and/or expensive product with a long sales period, wherein a customer may have questions or concerns about the product 202 during the sales period. For example, the product 202 may include a software development, hardware development, or other construction project or contract. As another example, the product 202 may include a previously-designed and/or developed item or product. In other example embodiments, the product 202 may include consulting services. Then for example, the sales representative 104 may be responsible for selling the product 202 to the customer and for responding to any customer inquiries 204 provided by the customer.

The customer inquiries 204 may include questions, comments, concerns, requests for proposals or other inquiries associated with the product 202. For example, the customer inquiries 202 may include whether the product 202 includes a particular feature, has a particular capability or whether the product 202 may be altered in some way. Other customer inquiries 202 may include, for example, how much the product 202 costs, how a particular feature is enabled/disabled or may include any other questions or comments about the product 202. The customer inquiries 204 may be inquiries received within a sales period (e.g., prior to a sale or delivery of the product 202, or at least a portion thereof) of the sales opportunity 206. According to an example embodiment, the customer inquiries 204 may be provided in a table or other list form. According to an example embodiment a customer may require or otherwise prefer a follow-up action and/or proposal by the sales representative 104 in response to one or more of the customer inquiries 204.

The sales opportunity 206 may include information associated with a lead or other opportunity to sell the product 202 to a potential or current consumer or client (e.g., customer 210). For example, the sales opportunity 206 may include the name, size, budget, contact information and/or other information associated with a customer. The sales opportunity 204 may also be associated with one or more products 202 to be sold to the customer. The sales opportunity 206 may also include, for example, what product 202 the customer is interested in, a quantity of the product 202 to be ordered and/or a likelihood or chance of success of a sale of the product 202 to the customer.

The sales opportunity 206 may include or otherwise be associated with one or more pre-sales documents 208. The pre-sales documents 208 may include lead documents, opportunity documents, quotation documents and/or other documents associated with a sales prospect for the product 202. The sales representative 104 may, for example, receive a lead document as an example of the pre-sales documents 208 and pitch the product 202 to the customer in response to the lead document 208. Then, for example, the customer may ask the sales representative 104 or otherwise provide the customer inquiries 204 in response to the lead document 208 (e.g., associated with the pitch, which may include brochures, flyers, white papers, data sheets, design documents, presentations and/or other materials about the product 202).

The customer 210 may include a current and/or potential customer or client who may be interested in purchasing or licensing the product 202. For example the sales representative 104 may be responsible for trying to sell the product 202 to the customer 210. According to an example embodiment, the customer 210 may include an individual, or may include an organization or company of individuals for whom any one or combination of the sales representative 104 may be responsible.

An inquiry handler 212 may be configured to receive the customer inquiries 204 from the customer 210. For example, the inquiry handler 212 may receive the customer inquiries 204 one-at-a-time, in one or more batches, in list, table, document or other form directly from the customer 210 and/or from the sales representative 104 (who may have received the customer inquiries 204 from the customer 210). Then for example, the inquiry handler 212 may process the customer inquiries 204 to a format consistent with the operational CRM 108 and/or data warehouse 126.

An opportunity parser 214 may determine which sales opportunity (e.g., sales opportunity 206) is associated with each of the customer inquiries 204. For example, as referenced above, the customer inquiries 204 may be provided in response to the pre-sales documents 208. Then for example, the opportunity parser 214 may determine an association between one or more of the customer inquiries 204 to the sales opportunity 206 and/or the product 202 based on the pre-sales documents 208.

Classification logic 216 may be used to determine or otherwise apply a classification, categorization, prioritization and/or other organization to the customer inquiries 204. For example, the customer inquiries 204 may be categorized with respect to one or more categories associated with the product 202. For example, the categories may include pricing, new features, usability, layout, etc. Or for example, the customer inquiries 204 may be prioritized based on an importance to the sales representative 104 and/or customer 210.

As referenced above, in response to the customer inquiries 204, the sales representative 104 may perform one or more sales activities 218. The sales activities 218 may include any action, activity, proposal or other response performed in association with the sales opportunity 206. The sales activities 218 may be performed, for example, in response to one or more of the customer inquiries 204. For example, a customer inquiry 204 may be about whether the product may be customized to include a particular feature. Then for example, the sales activities 218 may include a meeting with an engineer to determine if the product 202 may be customized as such and a response to the customer 210 indicating the answer. In another example embodiment, the sales activities 218 may include a response, if any, by the customer 210, including for example a follow-up question or inquiry.

An activity manager 222 may be configured to determine and/or track when a sales activity occurs with respect to or in response to one or more of the customer inquiries 204. According to an example embodiment, the activity manager may include diction logic 220 which may be configured to determine if and/or when a sales activity 218 is performed. For example, the detection logic 220 may be associated with the Operational CRM 108, which may be configured to track the sales activities 218. Then for example, the detection logic 220 may determine whether a sales activity 218 is performed and provide the determination to an activity manager 222.

The activity manager 222 may be configured to determine and/or otherwise track which of the customer inquiries 204, if any, the sales activities 218 are associated with. For example, the sales representative 104 may provide to the activity manager 222 which of the customer inquiries 204 have been responded to and by way of which of the sales activities 218. Or, for example, based on information determined by the detection logic 220, the activity manager 222 may associate the sales activities 218 to the customer inquiries 204. According to another example embodiment, the activity manager 222 and/or detection logic 220 may be part of the Operational CRM 108 which may be configured to track the sales activities 218.

A status engine 224 may determine or otherwise provide a status (e.g., status 236) for each of the customer inquiries 204. The status may indicate for example, whether or not a sales activity 218 was performed responsive to the customer inquiries 204 and/or whether the customer 210 was satisfied with the response. The status engine 224 may for example, determine the status based at least in part on the sales activities 218 determined by the activity manager 222.

Sort logic 226 may be configured to sort the customer inquiries 204 by any of multiple fields associated with each customer inquiry 204. For example, the customer inquiries 204 may be sorted based on status, class, customer, sales opportunity, date and/or any other field or information associated with the customer inquiries 204.

A report generator 228 may generate one or more reports associated with the customer inquiries 204. The report generator 228 may generate reports for different users based on their roles. For example, the sales representative 104 may view an activity report 230 of the customer inquiries 204, wherein the sales representative 104 may quickly determine the status of each customer inquiry 204 and which customer inquiry 204 to respond to next.

According to another example embodiment, the report generator 228 may generate reports for a sales manager to determine how each sales representative (e.g., 104) for whom the sales manger is responsible is performing with respect to responding to the customer inquiries 204. Then for example the sales manager may determine whether more or less resources may need to be allocated to one or more sales opportunities 206. Or for example, the report generator 228 may generate reports for a company or product developer to determine which categories associated with the product 202 receive the most customer inquiries 204. Then for example, the company or product developer may determine what, if any, changes should be made to the product 202 to satisfy more customers 210 and potentially increase sales.

The activity report 230 may include a summary, abstract, synopsis or other report or collection of information associated with the customer inquiries 204. The activity report 230 may include at least a portion and/or summary of the customer inquiries 204. The activity report 230 may include for example, a classification 232, an inquiry text 234, a status 236 and/or a satisfaction level 238.

The classification 232, as referenced above, may include a categorization, prioritization and/or other organization applied to the customer inquiries 204. The category 232A, as referenced above may include a category of the product 202 with which the customer inquiry 204 is associated. For example, a customer inquiry about whether the layout of a screen can be changed may be categorized as part of a "user interface" category. The category 232A may, for example, be determined by the sales representative 104.

The priority 232B, as referenced above, may be a priority or importance of the customer inquiry 204 to the customer 210. For example, a pricing customer inquiry 204 may be given a higher priority than a customer inquiry about whether the color of a menu item can be changed.

The inquiry text 234 may include at least a portion or description of the text of the customer inquiries 204. For example, the inquiry text 234 may include a string such as "Can the software be used to convert foreign currencies into US dollars?"

The status 236 may include a status of the customer inquiries 204. The status 236 may include for example, whether the customer inquiry 204 has been responded to (e.g., via one or more sales activities 218). Or for example, the status 235 may include whether the customer inquiry 204 has been satisfactorily responded to, as may determined based on the satisfaction level 238.

The satisfaction level 238 may include level of satisfaction or confidence associated with the sales activity 218 with respect to the customer inquiries 204. The satisfaction level 238 may include the level of satisfaction of the sales representative 104 and/or customer 210 with respect to the response to one or more of the customer inquiries 204. For example, the customer 210 may provide the satisfaction level 238 (e.g., in response to a satisfaction questionnaire or survey), or for example, the sales representative 104 may gauge and provide the satisfaction level 238 based on a response of the customer 210 to the sales activities 218.

According to an example embodiment, the report generator 228 may be configured to determine a likelihood of success of the sales opportunity 206 based on the satisfaction level 238. For example, if the majority of the customer inquiries 204 have a very low satisfaction level 238 then the likelihood of success of the sales opportunity 206 may be lower than if the satisfaction level 238 was high for the customer inquiries 204.

FIG. 3 is a block diagram of an example of the activity report 230 of FIG. 2, according to an example embodiment. In the example of FIG. 3, each row of the table may correspond to a customer inquiry 204.

In the first row, the customer inquiry (e.g., customer inquiries 204 from FIG. 2) may be associated with the performance category 232A, the inquiry text 234 may ask "Can it (e.g., the product 202) receive 60,000 sales per hour?" and have a priority 232B of 1 (e.g., the highest priority). Then for example, based on the satisfaction level 238 of 1, the status of the customer inquiry 204 may be "not okay" (e.g., the customer is not satisfied with the response to the customer inquiry 204).

The activity report of the example of FIG. 3, may also include a customer contact field 302, an activities field 304 and a last activity field 306. The customer contact field 302 may include one or more names, departments or other contacts and/or contact information associated with a customer. For example, a customer may include a large multinational corporation with multiple departments and decision makers within each department. Then for example, the customer contact field 302 may include the name and/or contact information of the person(s) who submitted the customer inquiry and/or to whom the response is to be directed. In the example of FIG. 3, the customer contact for the first customer inquiry 204 is "Miller."

The activities field 304 may include how many activities were performed, recorded and/or tracked with respect to the customer inquiry. For example, 5 activities may have been performed with regard to responding to the first customer inquiry. As discussed above, an activity may include any correspondence, action or other activity performed by a customer, sales representative and/or other party with respect to the customer inquiry. According to an example embodiment, the activities field 304 may be associated with a link, whereby if a user was to select the number provided in the activities filed 304, the user may be provided more detailed information regarding the activities performed.

The last activity field 304 may include a description associated with the last activity performed with respect to the customer inquiry. For example, in FIG. 3, the last activity field 306 may include the date of the last activity performed. According to an example embodiment, the last activity field 306 may be associated with a link, whereby if a user was to selects the date provided in the last activity filed 306, the user may be provided more detailed information regarding the last activity performed.

Figure 4:
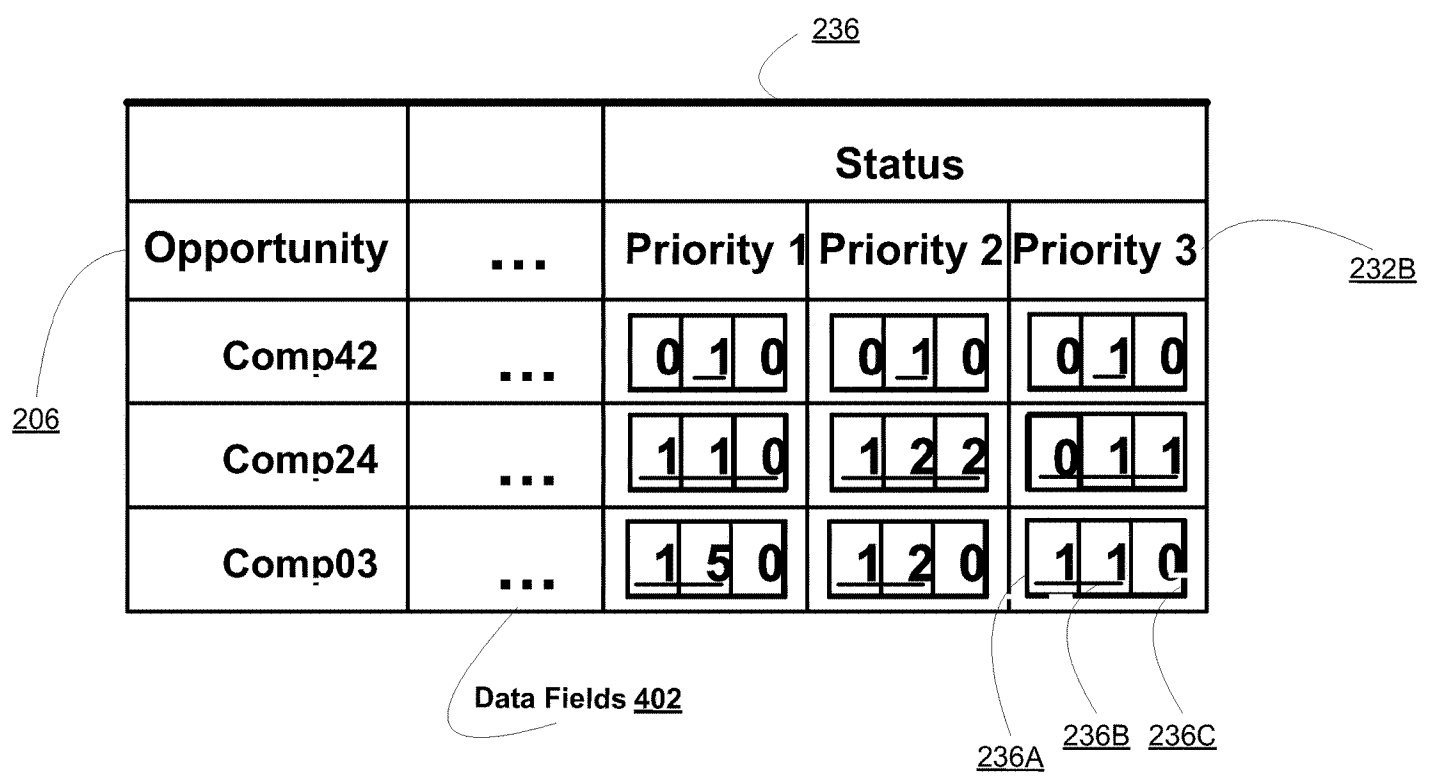

FIG. 4 is a block diagram of an example of the activity report 230 of FIG. 2, according to an example embodiment. In the example of FIG. 4, each row of the table may correspond to a sales opportunity 206.

The activity report in the example of FIG. 4 may be provided at a level of abstraction greater than the activity report provided in the example of FIG. 3. For example, the status field 236 may include or otherwise be subdivided to include three priority 232B subdivisions, Priority 1, Priority 2 and Priority 3. Each priority subdivision 232B may then be subdivided into one or more status fields 236A, 236B and 236C. The status fields 236A, 236B and 236C may correspond to how many customer inquiries associated with a sales opportunity 206 are unsatisfactory (e.g., not okay), open (e.g., unresolved) and okay, respectively.

For example, the Comp03 sales opportunity 206, there may be six priority 1 customer inquiries, of which one has been unsatisfactorily responded to, five remain open or still need to be responded to and zero have been resolved to the customer's satisfaction. Similarly with regard to the priority 2 customer inquiries, there may be one that is unsatisfactory, two to be addressed and again zero that have been satisfactorily responded to by a sales representative.

The activity report of FIG. 4, may also include data field 402, which may include any of the fields from the activity report 230 of FIG. 2 and/or any other combination of fields associated with the customer inquiries and/or sales opportunities 206.

In other example embodiments, additional and/or different activity reports at varying levels of abstraction may be provided. For example, the activity report of FIG. 4 may include the three sales opportunities 206 (e.g., Comp 42, Comp 24 and Comp03) for which a sales representative may be responsible. Then for example an additional abstraction layer may be added to the activity report of FIG. 4, wherein the new activity report may include how many priority 1 and/or priority 2 customer inquiries are unsatisfactory 236A, open 236B and resolved 236C. For example, the new activity report, based on the activity report of FIG. 4, may include a box with the numbers 4, 12, and 2 corresponding to how many priority 1 and priority 2 customer inquires are unsatisfactory, unresolved and satisfactorily resolved. Then for example, a manager may determine based on the activity report whether or not to allocate more resources towards resolving the open and/or unsatisfactory customer inquiries.

According to an example embodiment, the priority fields (e.g., 236A, 236B and 236C) may include links to the associated customer inquiries. For example, clicking on the box for the priority 1 fields for Comp03 that are open (e.g., the box with the number 5) may provide more detailed about one or more of the customer inquiries associated with the box.

The activity report of FIG. 4 may be useful, for example, for a sales manager to quickly review the status of one or more sales representatives for whom the manager may be responsible. Or for example, the activity report of FIG. 4 may be useful for a sales representative to determine his or her own status with regards to open customer inquiries and/or provide that status information to an interested third party, such as to a sales manager for a weekly progress review.

Figure 5:
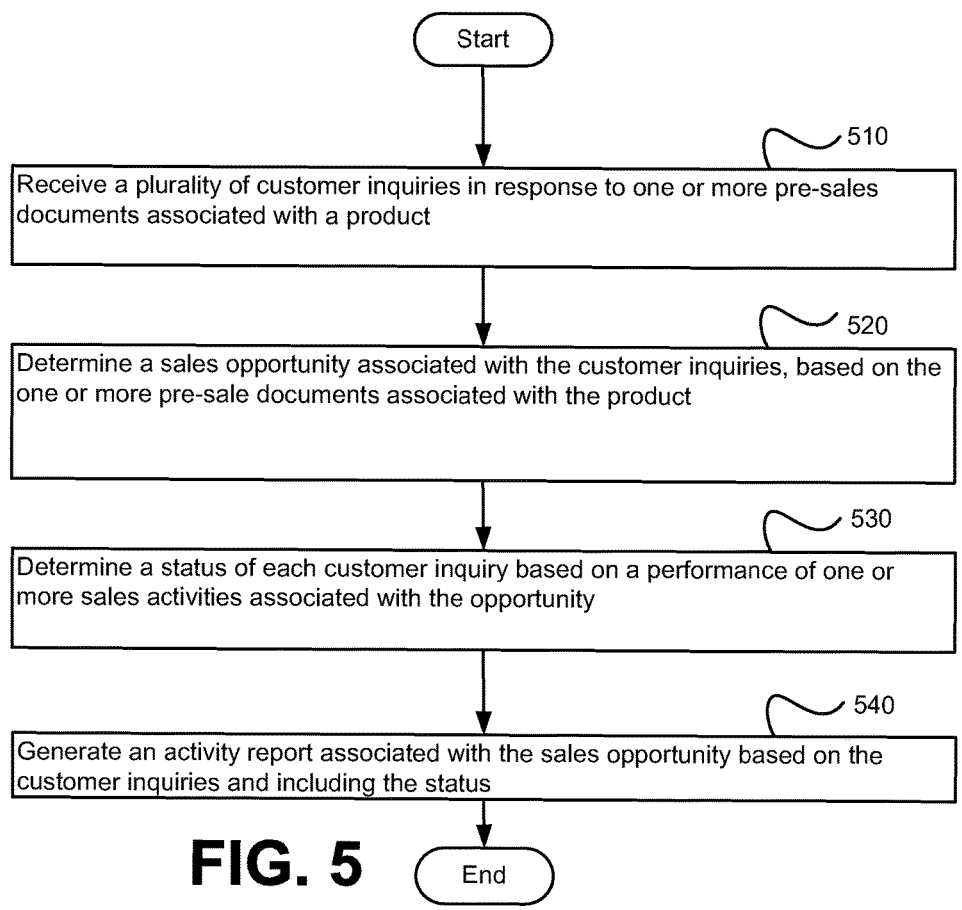
FIG. 5 is a flowchart illustrating example operations of the system of FIG. 2, according to an example embodiment.

FIG. 5 is a flowchart 500 illustrating example operations of the system of FIG. 2, according to an example embodiment. More specifically, FIG. 5 illustrates an operational flow 500 representing example operations related to a sales opportunity and inquiry system.

After a start operation, a plurality of customer inquiries may be received in response to one or more pre-sales documents associated with a product (510). For example, as shown in FIG. 2, the inquiry handler 212 may receive the customer inquiries 204 in response to the pre-sales documents 208 associated with the product 230.

A sales opportunity associated with the customer inquiries may be determined based on the one or more pre-sale documents associated with the product (520). For example, the opportunity parser 214 may determine that the sales opportunity 206 is associated with customer inquiries 204 based on the pre-sales documents 208, wherein the pre-sales documents 208 may be associated with the product 202.

A status of each customer inquiry may be determined based on a performance of one or more sales activities associated with the opportunity (530). For example, the activity manager 222, including the detection logic 220, may determine when a sales activity 218 is performed responsive to one or more of the customer inquiries 204. Then for example, the status engine 224 may determine the status 236 based on the sales activities 218 and/or the satisfaction level 238 associated with each customer inquiry 204.

An activity report associated with the sales opportunity may be generated based on the customer inquiries and including the status (540). For example, the report generator 228 may generate the activity report 230 based on the customer inquiries 204 and including the status 236.

Although the above description is provided in terms of specific examples, it will be appreciated that many other examples and settings are contemplated. For example, the term business document should be interpreted broadly as including any document that is used in profit generation of some sort, although the business document 104 also may refer to documents for non-profit endeavors as well, including, for example, schools, churches, charities, hospitals, or virtually any other organization. Further, the business document 104 is merely an example, and other applications, such as applications for personal use, also may be used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the embodiments.

What is claimed is:

1. A non-transitory computer-readable storage medium storing code representing instructions that when executed are configured to cause a processor to perform a customer relationship management process comprising:

receiving a plurality of customer inquiries related to one or more pre-sales documents associated with a product;

associating a sales opportunity with the plurality of customer inquiries based on the one or more pre-sales documents;

tracking one or more sales activities performed with respect to the sales opportunity and in response to the plurality of customer inquiries;

determining a status for each of the plurality of customer inquiries based on the one or more sales activities, status being one of a resolved status, an unresolved status, and an unsatisfactory status;

generating an activity report including a status field associated with the sales opportunity, the status field divided into at least two priority subdivisions, each priority subdivision divided into a plurality of status indicators, each of the plurality of customer inquiries being sorted into the at least two priority subdivisions based on a priority associated with the customer inquiry, each status indicator representing a count of the status determined for each of the plurality of customer inquiries and including a link to information for each customer inquiry of the respective status;

providing the activity report to a computing device for display in a user interface on the computing device;

receiving an indication of a selection of the link to information for each customer inquiry of a respective status; and in response to receiving the indication of the selection of the link, providing information associated with each customer inquiry sorted into the priority subdivision for the status field and that is of the respective status, the information for display in the user interface of the computing device.

2. The non-transitory computer-readable medium of claim 1, further comprising:
determining an association between the plurality of customer inquiries and the one or more pre-sales documents.

3. The non-transitory computer-readable medium of claim 1, further comprising:
determining that the sales opportunity is associated with the product based on the pre-sales documents.

4. The non-transitory computer-readable medium of claim 1, further comprising:
selecting the sales opportunity from a plurality of sales opportunities associated with the product.

5. The non-transitory computer-readable medium of claim 1, further comprising:
determining a sales activity of the one or more sales activities has been performed responsive to the plurality of customer inquiries.

6. The non-transitory computer-readable medium of claim 1, further comprising:
determining a likelihood of success of the sales opportunity based on the status of each customer inquiry from the plurality of customer inquiries.

7. The non-transitory computer-readable medium of claim 1, further comprising:
sorting the plurality of customer inquiries based on a category.

8. The non-transitory computer-readable medium of claim 1, wherein a likelihood of success of the sales opportunity based on the status of each of the plurality of customer inquiries is represented within the activity report.

9. A method for performing a customer relationship management process comprising:
receiving a plurality of customer inquiries related to one or more pre-sales documents associated with a product;
associating a sales opportunity with the plurality of customer inquiries based on the one or more pre-sale documents associated with the product;
tracking one or more sales activities performed with respect to the sales opportunity and in response to the plurality of customer inquiries;
determining at a customer relationship management server a status for each of the plurality of customer inquiries based on a performance of one or more sales activities associated with the sales opportunity, the status being one of a resolved status, an unresolved status, and an unsatisfactory status;
generating an activity report including a status field associated with the sales opportunity, the status field divided into at least two priority subdivisions, each priority subdivision divided into a plurality of status indicators, each of the plurality of customer inquiries being sorted into the at least two priority subdivisions based on a priority associated with the customer inquiry, each status indicator representing a count of the status determined for each of the plurality of customer inquiries and including a link to information for each customer inquiry of the respective status;
providing the activity report to a computing device for display in a user interface on the computing device;
receiving an indication of a selection of the link to information for each customer inquiry of a respective status; and
in response to receiving the indication of the selection of the link, providing information associated with each customer inquiry sorted into the priority subdivision for the status field and that is of the respective status, the information for display in the user interface of the computing device.

10. The method of claim 9, wherein determining a status for each of the plurality of customer inquiries based on the one or more sales activities includes determining the performance of the one or more sales activities.

11. The method of claim 9, wherein determining a status for each of the plurality of customer inquiries based on the one or more sales activities includes determining a respective customer satisfaction level associated with each of the one or more sales activities.

12. The method of claim 9, wherein the activity report further includes a summary of at least a portion of the plurality of customer inquiries.

13. The non-transitory computer-readable medium of claim 1, wherein the activity report further includes a a respective customer satisfaction level associated with the one or more sales activities, the customer satisfaction level being based on a responsiveness of a performance of one or more sales activities to at least a portion of the plurality of customer inquiries.

14. The non-transitory computer-readable medium of claim 1,
wherein the plurality of customer inquiries are from a customer,
wherein the sales opportunity is an opportunity for a sales representative to sell a product to the customer, and
wherein at least one customer inquiry from the plurality of customer inquiries is associated with a count of a number of sales activities performed in response to the at least one customer inquiry.

15. The non-transitory computer-readable medium of claim 1, wherein the plurality of customer inquiries are defined by a customer, and the sales opportunity is an opportunity for a sales representative to sell a product to the customer.

16. The non-transitory computer-readable medium of claim 1,
wherein the plurality of customer inquiries are defined by a customer,
wherein the sales opportunity is an opportunity for a sales representative to sell a product to the customer, and
wherein the sales representative associates the priority with the customer inquiry.

17. The non-transitory computer-readable medium of claim 1, wherein the activity report further includes:

a second another sales opportunity associated with the status field; and another plurality of customer inquiries associated with the other sales opportunity, each of the other plurality of customer inquiries being sorted into the at least two priority subdivisions based on a priority associated with each of the other plurality of customer inquiries.

18. The method of claim 9, wherein the activity report includes a customer satisfaction level based on a responsiveness of a performance of at least one of the one or more sales activities with respect to at least one of the customer inquiries.

19. The method of claim 9, wherein the method further comprises:
sorting the plurality of customer inquiries based on a category associated with each of the customer inquiries.

20. The method of claim 9, wherein generating the activity report further includes, for each customer inquiry included in the plurality of customer inquiries, associating an activity value with the customer inquiry, the activity value indicative of a number of activities performed in association with the customer inquiry.

21. A customer relationship management (CRM) system comprising:
a computing device including a sales activity interface;
a data warehouse; and
a CRM server including an operational CRM module and a CRM middleware module;
the CRM middleware module being configured to connect the CRM server and the operational CRM module to the data warehouse; and
the operational CRM module being configured to:
receive a plurality of customer inquiries related to one or more pre-sales documents included in the data warehouse, the one or more pre-sales documents associated with a product;
associate a sales opportunity with the plurality of customer inquiries based on the one or more pre-sales documents;
track one or more sales activities performed with respect to the sales opportunity and in response to the plurality of customer inquiries; and
determine a status for each of the plurality of customer inquiries based on the one or more sales activities, the status being one of a resolved status, an unresolved status, and an unsatisfactory status;
generate an activity report including a status field associated with the sales opportunity, the status field divided into at least two priority subdivisions, each priority subdivision divided into a plurality of status indicators, each of the plurality of customer inquiries being sorted into the at least two priority subdivisions based on a priority associated with the customer inquiry, each status indicator representing a count of the status determined for each of the plurality of customer inquiries and including a link to information for each customer inquiry of the respective status;
provide the activity report to the computing device for viewing in the sales activity interface;
receive, from the computing device, an indication of a selection of the link to information for each customer inquiry of a respective status; and
in response to receiving the indication of the selection of the link, provide information associated with each customer inquiry sorted into the priority subdivision for the status field and that is of the respective status, the information for viewing in the sales activity interface.

\* \* \* \* \*